United States Patent [19]

Campbell

[11] 3,711,608
[45] Jan. 16, 1973

[54] THE TREATMENT OF PAIN, FEVER AND INFLAMMATION WITH BENZIMIDAZOLES

[75] Inventor: William C. Campbell, Summit, N.J.

[73] Assignee: Merck & Co., Inc., Rahway, N.J.

[22] Filed: April 13, 1971

[21] Appl. No.: 133,705

[52] U.S. Cl. ................................................424/270
[51] Int. Cl. ..............................................A61k 27/00
[58] Field of Search.......................................424/270

[56] References Cited

UNITED STATES PATENTS 3,017,415  1/1962  Sarett et al. ..........................260/302

FOREIGN PATENTS OR APPLICATIONS 351  12/1969  South Africa

Primary Examiner—Stanley J. Friedman
Attorney—I. Louis Wolk, J. Jerome Behan and Frank M. Mahon

[57] ABSTRACT

Pharmaceutical formulations containing therapeutically effective quantities of 2-substituted and 2,5-disubstituted benzimidazoles are employed in the application of anti-inflammatory, analgesic and antipyretic therapy.

7 Claims, No Drawings

THE TREATMENT OF PAIN, FEVER AND INFLAMMATION WITH BENZIMIDAZOLES

This invention relates to a method of treating inflammation in its varying manifestations, utilizing novel anti-inflammatory compositions containing effective quantities of substituted benzimidazoles as the active ingredient. In addition, these novel compositions exhibit potent analgesic and antipyretic activity and this invention relates also to analgesic and antipyretic methods and compositions. More particularly, this invention is concerned with compositions containing the substituted benzimidazoles, as hereinafter defined, for use in the treatment of inflammation and associated pain and fever. Furthermore, this invention is directed to analgesic and antipyretic methods for the relief and treatment of pain and fever not symptomatically related to an inflammatory indication and to compositions utilized therein.

In its composition aspect, therefore, the instant invention may be described as residing in the concept of pharmaceutical formulations containing as the essential active ingredient one, or a mixture, of substituted benzimidazoles of the formula:

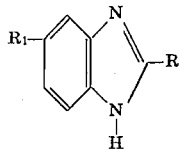

wherein R is a five-membered heteroaromatic radical selected from the group consisting of thiazolyl, isothiazolyl and thiadiazolyl; and
$R_1$ is a member selected from the group consisting of hydrogen, loweralkyl, loweralkoxy, halogen, phenyl halophenyl and

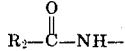

wherein $R_2$ is a member selected from the group consisting of loweralkoxy, phenyl and halophenyl
and the non-toxic pharmaceutically acceptable acid addition salts thereof in combination with a non-toxic pharmaceutically acceptable carrier. It is contemplated that dosage units of such formulations containing therapeutically effective quantities of the substituted benzimidazole will be administered orally, topically or by suppository in the application of anti inflammatory, antipyretic and analgesic therapy.

As used herein, the terms, "loweralkyl," and "loweralkoxy"are intended to include both straight and branched chain loweralkyl and loweralkoxy groups containing from one to eight carbon atoms in the hydrocarbon moiety such as, for example, methoxy, ethyl, propyl, isopropoxy, n-butoxy, n-hexyl, n-octyloxy and the like. The term, "halogen" is intended to include fluorine, bromine, chlorine and iodine and the term, "halophenyl" is intended to include phenyl substituted by one or more of the halogens, fluorine, bromine, chlorine and iodine such as, for example, ortho-, meta- and para-, chlorophenyl, ortho-, meta- and parafluorophenyl and the like. Pharmaceutically acceptable acid addition salts will include non-toxic salts derived from both inorganic and organic acids such as, for example, the hydrochloride, sulfate, nitrate, phosphate, hypophosphite, lactate, methanesulfonate, citrate, acetate, propionate, oxalate, succinate, and the like.

The substituted benzimidazoles utilized in the practice of this invention are well-known compounds and are either available commercially or may be readily prepared by methods already fully described in the patent and chemical literature. The instant invention, therefore, does not reside in the substituted benzimidazoles per se but is based on the discovery that these compounds display important therapeutic properties heretofore unreported.

As pointed out above, the substituted benzimidazoles of this invention possess a high degree of anti-inflammatory analgesic and antipyretic activity. They are of value in the treatment of arthritic and dermatological disorders or like conditions responsive to anti-inflammatory drugs. In general they are indicated for a wide variety of conditions where one or more of the symptoms of inflammation, fever and pain are manifested. Included within this category are diseases such as rheumatoid arthritis, osteo arthritis, gout, infectious arthritis, rheumatic fever, parasitic infections characterized by inflammatory symptoms. As indicated above the compounds utilized in the practice of the invention also possess a useful degree of analgesic and antipyretic activity.

For these purposes the compounds of the invention may be administered orally, topically, parenterally, by inhalation spray or rectally in dosage unit formulations containing conventional non-toxic pharmaceutically acceptable carriers, adjuvants and vehicles. In addition to the treatment of warm-blooded animals such as mice, rats, horses, dogs, cats, etc., the compounds of the invention are effective in the treatment of humans.

Pharmaceutical formulations containing the active ingredient may be in a form suitable for oral use, for example, as tablets, troches, lozenges, aqueous or oily suspensions, dispersible powders or granules, emulsions, hard or soft capsules, syrups or elixirs. Formulations intended for oral use may be prepared according to any method known to the art for the manufacture of pharmaceutical formulations and such formulations may contain one or more agents selected from the group consisting of sweetening agents, flavoring agents, coloring agents and preserving agents in order to provide a pharmaceutically elegant and palatable preparation. Tablets contain the active ingredient in admixture with non-toxic pharmaceutically acceptable excipients which are suitable for manufacture of tablets. These excipients may be, for example, inert diluents, such as calcium carbonate, sodium carbonate, lactose, calcium phosphate or sodium phosphate; granulating and disintegrating agents, for example maize starch, or alginic acid; binding agents, for example starch, gelatine or acacia, and lubricating agents, for example magnesium stearate, stearic acid or talc. The tablets may be uncoated or they may be coated by known techniques to delay disintegration and absorption in the gastro-intestinal tract and thereby provide a sustained action over a longer period. For example, a time delay material such as glyceryl monostearate or glyceryl distearate above or with a wax may be employed.

Formulations for oral use may also be presented as hard gelatine capsules wherein the active ingredient is mixed with an inert solid diluent, for example calcium carbonate, calcium phosphate or kaolin, or as soft gelatine capsules wherein the active ingredient is mixed with water or an oil medium, for example arachis oil, peanut oil, liquid paraffin or olive oil.

Aqueous suspensions contain the active materials in admixture with excipients suitable for the manufacture of aqueous suspensions. Such excipients are suspending agents, for example sodium carboxymethylcellulose, methylcellulose, hydroxypropylmethylcellulose, sodium alginate, polyvinylpyrrolidone, gum tragacanth and gum acacia; dispersing or wetting agents may be a naturally-occurring phosphatide, for example lecithin, or condensation products of an alkylene oxide with fatty acids, for example polyoxyethylene stearate, or condensation products of ethylene oxide with long chain aliphatic alcohols, for example heptadecaethyleneoxycetanol, or condensation products of ethylene oxide with partial esters derived from fatty acids and a hexitol such as polyoxyethylene sorbitol mono-oleate, or condensation products of ethylene oxide with partial esters derived from fatty acids and hexitol anhydrides, for example polyoxyethylene sorbitan mono-oleate. The said aqueous suspensions may also contain one or more preservatives, for example ethyl or n-propyl, p-hydroxy benzoate, one or more coloring agents, one or more flavoring agents and one or more sweetening agents, such as sucrose of saccharin.

Oily suspensions may be formulated by suspending the active benzimidazole in a vegetable oil for example arachis oil, olive oil, sesame oil or coconut oil, or in a mineral oil such as liquid paraffin. The oily suspensions may contain a thickening agent, for example beeswax, hard paraffin or cetyl alcohol. Sweetening agents, such as those set forth above, and flavoring agents may be added to provide a palatable oral preparation. These compositions may be preserved by the addition of an antioxidant such as ascorbic acid.

Dispersible powders and granules suitable for preparation of an aqueous suspension by the addition of water provide the active ingredient in admixture with a dispersing or wetting agents and suspending agents are exemplified by those already mentioned above. Additional excipients, for example sweetening, flavoring and coloring agents may also be present.

The pharmaceutical formulations of the invention may also be in the form of oil-in-water emulsions. The oily phase may be a vegetable oil, for example olive oil or arachis oils, or a mineral oil, for example liquid paraffin or mixtures of these. Suitable emulsifying agents may be naturally occurring gums, for example gum acacia or gum tragacanth, naturally-occurring phosphatides, for example soya bean lecithin, and esters or partial esters derived from fatty acids and hexitol anhydrides, for example sorbitan monooleate, and condensation products of the said partial esters with ethylene oxide, for example polyoxyethylene sorbitan monooleate. The emulsions may also contain sweetening and flavoring agents.

Syrups and elixirs may be formulated with sweetening agents, for example glycerol, sorbitol or sucrose. Such formulations may also contain a demulcent, a preservative and flavoring and coloring agents. The pharmaceutical formulations may be in the form of a sterile injectable preparation, for example as a sterile injectable aqueous or oleagenous suspension. This suspension may be formulated according to the known art using those suitable dispersing or wetting agents and suspending agents which have been mentioned above. The sterile injectable preparation may also be a sterile injectable solution or suspension in a non-toxic parenterally-acceptable diluent or solvent, for example as a solution in 1, 3-butanediol. Among the acceptable vehicles and solvents that may be employed are water, Ringer's solution and isotonic sodium chloride solution. In addition sterile, fixed oils are conventionally employed as a solvent or suspending medium. For this purpose any bland fixed oil may be employed including synthetic mono- or diglycerides. In addition, fatty acids such as oleic acid find use in the preparation of injectibles.

The compounds of this invention may also be administered in the form of suppositories for rectal administration of the drug. These compositions can be prepared by mixing the drug with a suitable non-irritating excipient which is solid at ordinary temperatures but liquid at the rectal temperature and will therefore melt in the rectum to release the drug. Such materials are cocoa butter and polyethylene glycols.

For topical use, creams, ointments, jellies, solutions or suspensions etc. . . . containing the anti-inflammatory agents are employed.

Dosage levels of the order of 100 mg. to 3,000 mg. per day are useful in the treatment of the above indicated conditions. For example, inflammation is effectively treated and antipyretic and analgesic activity manifested by the administration from about 50 to 300 mg. of the compound per kilogram of body weight per day. Advantageously from about 10 mg. to about 300 mg. per kilogram of body weight and especially from about 25 mg. to about 150 mg./kg. per daily dosage produce highly effective results.

The amount of active ingredient that may be combined with the carrier materials to produce a single dosage form will vary depending upon the host treated and the particular mode of administration. For example a formulation intended for the oral administration of humans may contain from 100 mg. to 3.0 gm. of active agent compound with an appropriate and convenient amount of carrier material which may vary from about 5 to about 95 percent of the total composition. Dosage unit forms will generally contain between from about 25 mg. to about 500 mg. of active ingredient.

It will be understood, however, that the specific dose level for any particular patient will depend upon a variety of factors including the activity of the specific compound employed, the age, body weight, general health, sex, diet, time of administration, route of administration, rate of excretion, drug combination and the severity of the particular disease undergoing therapy.

The following are illustrative of the techniques that may be employed in the preparation of pharmaceutical formulations to be utilized in the practice of the invention:

EXAMPLE 1

A mixture of 250 parts of 2-(4'-thiazolyl)-benzimidazole and 25 parts of lactose is granulated with suitable water, and to this is added 100 parts of maize starch. The mass is passed through a 16 mesh screen. The granules are dried at a temperature below 60° C. The dry granules are passed through a 16 mesh screen, and mixed with 3.8 parts of magnesium stearate. They are then compressed into tablets suitable for oral administration.

The 2-(4'-thiazolyl)benzimidazole used in the foregoing example may be replaced by 25, 100, 250, or 500 parts of this or other benzimidazoles of this invention to produce tablets suitable for oral administration as an anti-inflammatory, antipyretic and/or analgesic according to the method of this invention.

EXAMPLE 2

A mixture of 50 parts of 5(6)-isopropoxycarbonylamino-2-(4'-thiazolyl)benzimidazole, 3 parts of the calcium salt of lignin sulphonic acid, and 237 parts of water is ball-milled until the size of substantially all of the particles of 4-methyl-2-[1H]-pyridone is less than 10 microns. The suspension is diluted with a solution containing 3 parts of sodium carboxymethylcellulose and 0.9 parts of the butyl ester of p-hydroxybenzoic acid in 300 parts of water. There is thus obtained an aqueous suspension suitable for oral administration for therapeutic purposes.

EXAMPLE 3

A mixture of 250 parts of 5(6)-p-fluorobenzoylamino-2-(4'-thiazolyl)benzimidazole, 200 parts of maize starch and 30 parts of alginic acid is mixed with a sufficient quantity of a 10 percent aqueous paste of maize starch, and granulated. The granules are dried in a current of warm air and the dry granules are then passed through a 16-mesh screen mixed with 6 parts of magnesium stearate and compressed into tablet form to obtain tablets suitable for oral administration.

EXAMPLE 4

A mixture of 500 parts 5(6)-benzoylamino-2-(4'-thiazolyl)benzimidazole, 60 parts maize starch and 20 parts of gum acacia is granulated with a sufficient quantity of water. The mass is passed through a 12-mesh screen and the granules are dried in a current of warm air. The dry granules are passed through a 16-mesh screen, mixed with 5 parts of magnesium stearate and compressed into tablet form suitable for oral administration.

EXAMPLE 5

1. Tablets. — 10,000 scored tablets for oral use, each containing 500 mg. of benzimidazole, are prepared from the following ingredients:

|  | Gm. |
|---|---|
| 2-[4'-(1',2',3',-thiadiazolyl)]-benzimidazole | 5000 |
| Starch, U.S.P. | 350 |
| Talc, U.S.P. | 250 |
| Calcium stearate | 35 |

The powdered benzimidazole is granulated with a 4% w./v. aqueous solution of methylcellulose U.S.P. (1,500 cps.). To the dried granules is added a mixture of the remainder of the ingredients and the final mixture compressed into tablets of proper weight.

2. Capsules. — 10,000 two-piece hard gelatine capsules for oral use, each containing 250 mg. of benzimidazole are prepared from the following ingredients:

|  | Gm. |
|---|---|
| 2-(4'-isothiazolyl)benzimidazole | 2500 |
| Lactose, U.S.P. | 1000 |
| Starch, U.S.P. | 300 |
| Talc, U.S.P. | 65 |
| Calcium stearate | 25 |

The powdered benzimidazole is mixed with the starch-lactose mixture followed by the talc and calcium stearate. The final mixture is then encapsulated in the usual manner. Capsules containing 10, 25, 50, and 100 mg. of benzimidazole are also prepared by substituting 100, 250, 500 and 1,000 gm. for 2,500 gm. in the above formulation.

3. Soft elastic capsules. — One-piece soft elastic capsules for oral use, each containing 200 mg. of 2-(2'-thiazolyl)benzimidazole, are prepared in the usual manner by first dispersing the powdered active material in sufficient corn oil to render the material capsulatable.

4. Aqueous suspension. — An aqueous suspension for oral use containing in each 5 ml., 1 gram of benzimidazole is prepared from the following ingredients:

|  | Gm. |
|---|---|
| 5(6)-p-fluorophenyl-2-(4'-thiazolyl)-benzimidazole | 2000 |
| Methylparaben, U.S.P. | 7.5 |
| Propylparaben, U.S.P. | 2.5 |
| Saccharin sodium | 12.5 |
| Glycerin | 3000 |
| Tragacanth powder | 10 |
| Orange oil flavor | 10 |
| F. D. and C. orange dye | 7.5 |
| Deionized water, q.s. to 10,000 mg. | |

Although the instant invention has been described above specifically in terms of employing the benzimidazoles of Formula I as the essential active ingredient in the application of anti-inflammatory, antipyretic and analgesic therapy, many modifications in the invention as described will suggest themselves to those skilled in the art from a study of the foregoing specification. Applicant considers all such obvious modifications to be the full equivalent of the invention as described above and to fall within the scope of the instant invention.

The subject matter which applicant regards as their invention is particularly pointed out and distinctly claimed as follows:

1. A method of treating a condition exhibiting at least one of the symptoms of pain, fever and inflammation which comprises the administration to humans and animals suffering from at least one of the symptoms of pain, fever and inflammation of a therapeutically effective amount of a benzimidazole having the formula:

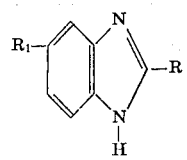

wherein R is a five-membered heteroaromatic radical selected from the group consisting of thiazolyl, isothiazolyl and thiadiazolyl; and $R_1$ is a member selected from the group consisting of hydrogen, loweralkyl, loweralkoxy, halogen, phenyl, halophenyl and

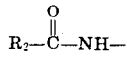

wherein $R_2$ is a member selected from the group consisting of loweralkoxy, phenyl and halophenyl, or a non-toxic pharmaceutically acceptable acid addition salt thereof.

2. The method according to claim 1 wherein R is thiazolyl.

3. The method according to claim 2 wherein $R_1$ is hydrogen.

4. The method according to claim 2 wherein $R_1$ is

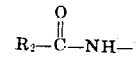

wherein $R_2$ is a member selected from the group consisting of loweralkoxy, phenyl and halophenyl.

5. The method according to claim 4 wherein $R_2$ is isopropoxy.

6. The method according to claim 4 wherein $R_2$ is phenyl.

7. The method according to claim 4 wherein $R_2$ is p-fluorophenyl.

* * * * *